July 6, 1965
G. LANGE
3,192,748
METHOD AND APPARATUS FOR PRODUCING COIL SPRINGS
Filed Nov. 7, 1962
9 Sheets-Sheet 2
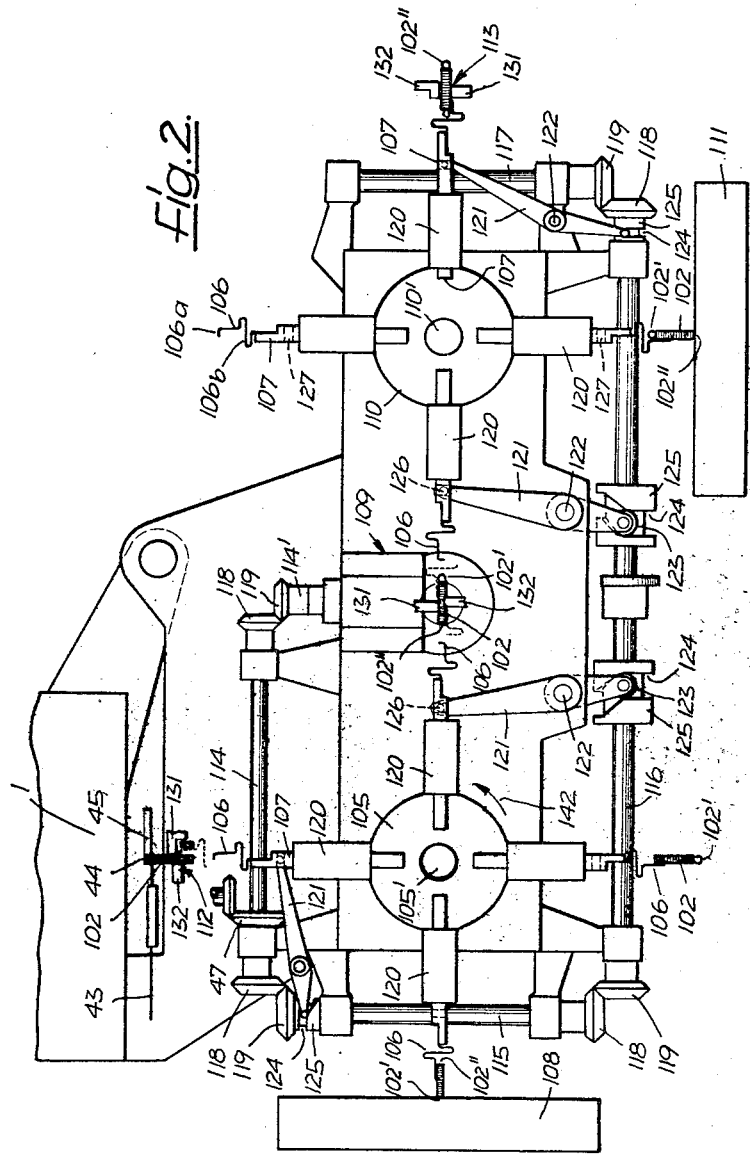
INVENTOR.
Gerhard Lange
BY Ernest Montague
Attorney

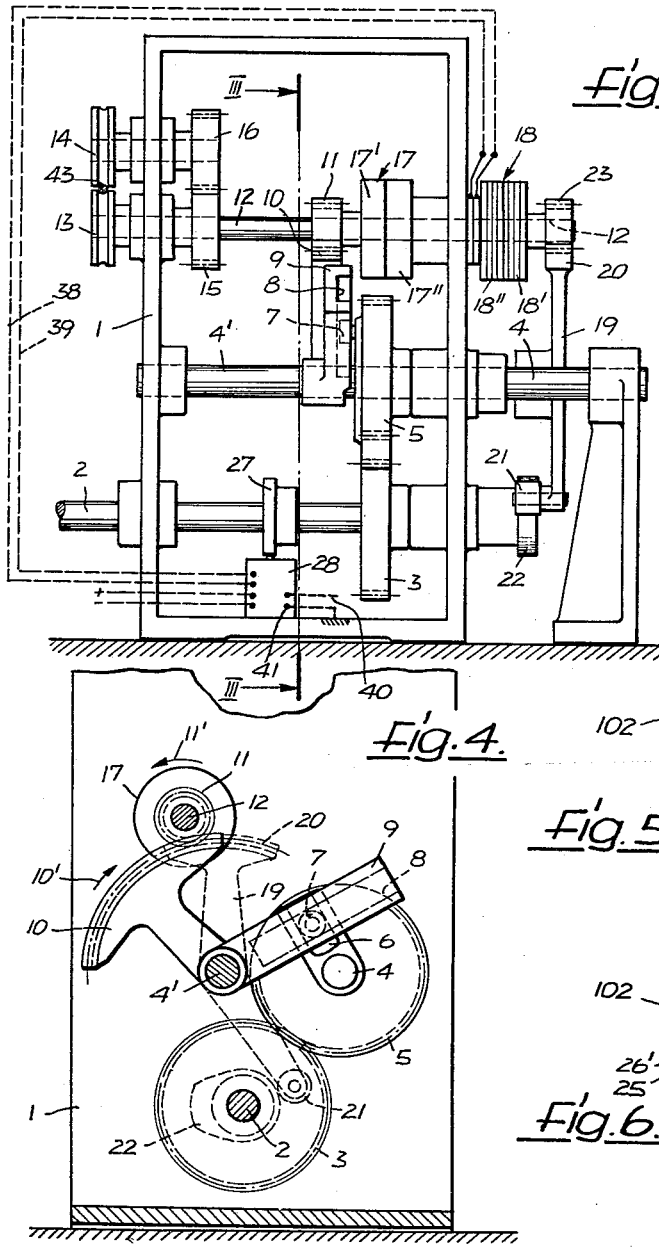

July 6, 1965 G. LANGE 3,192,748
METHOD AND APPARATUS FOR PRODUCING COIL SPRINGS
Filed Nov. 7, 1962 9 Sheets-Sheet 4

INVENTOR.
Gerhard Lange
BY Ernest Montague
Attorney

July 6, 1965  G. LANGE  3,192,748
METHOD AND APPARATUS FOR PRODUCING COIL SPRINGS
Filed Nov. 7, 1962  9 Sheets-Sheet 5
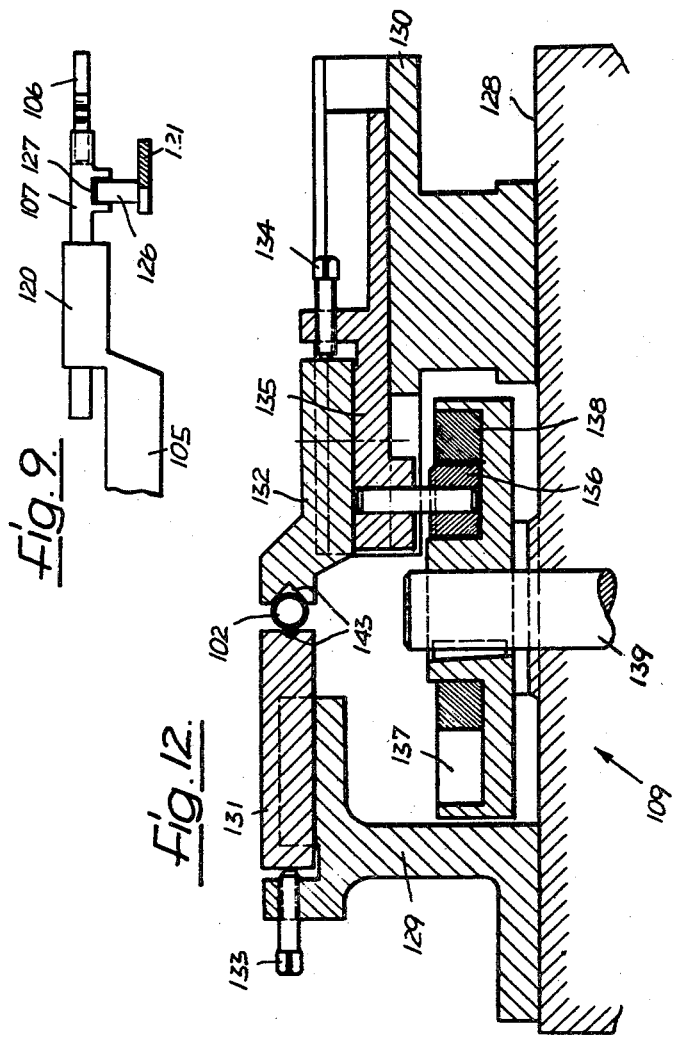
INVENTOR
Gerhard Lange
BY

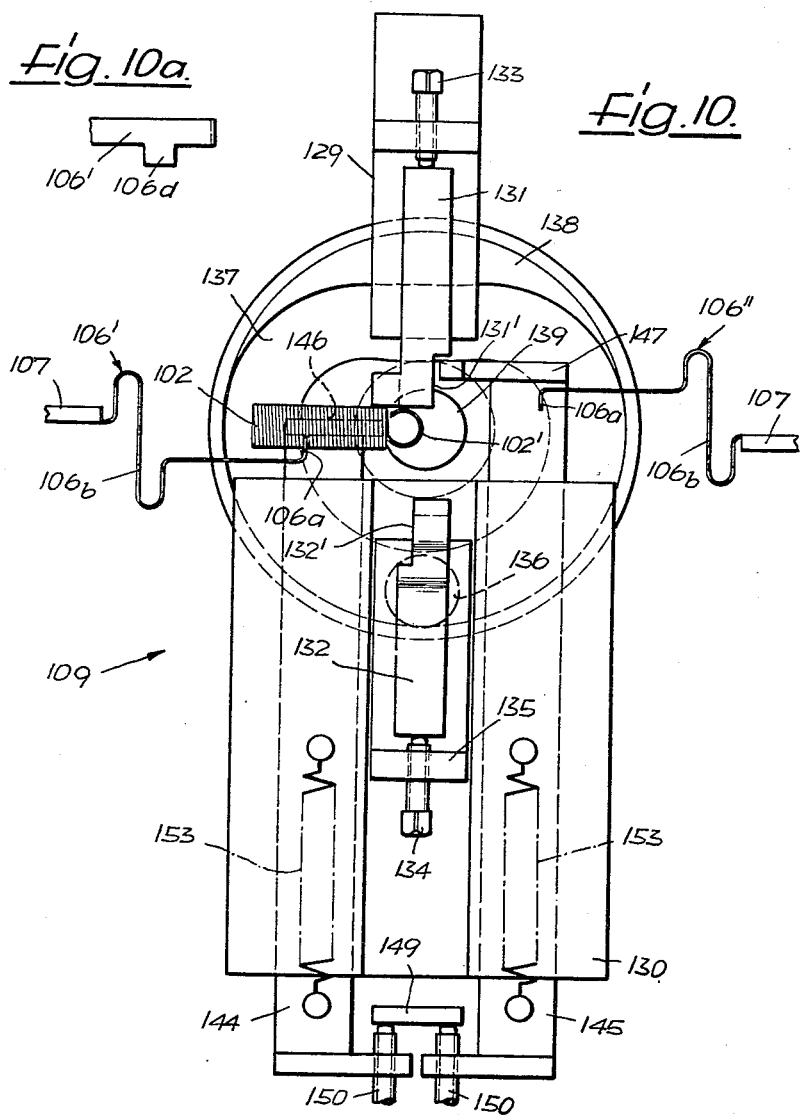

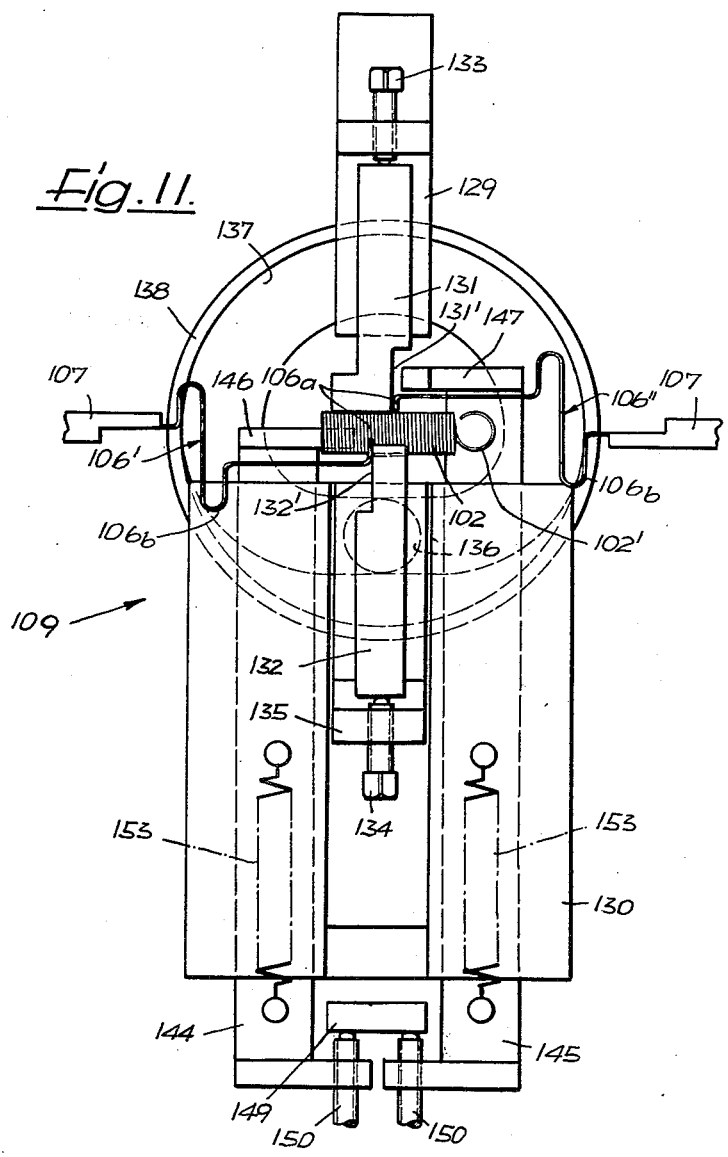

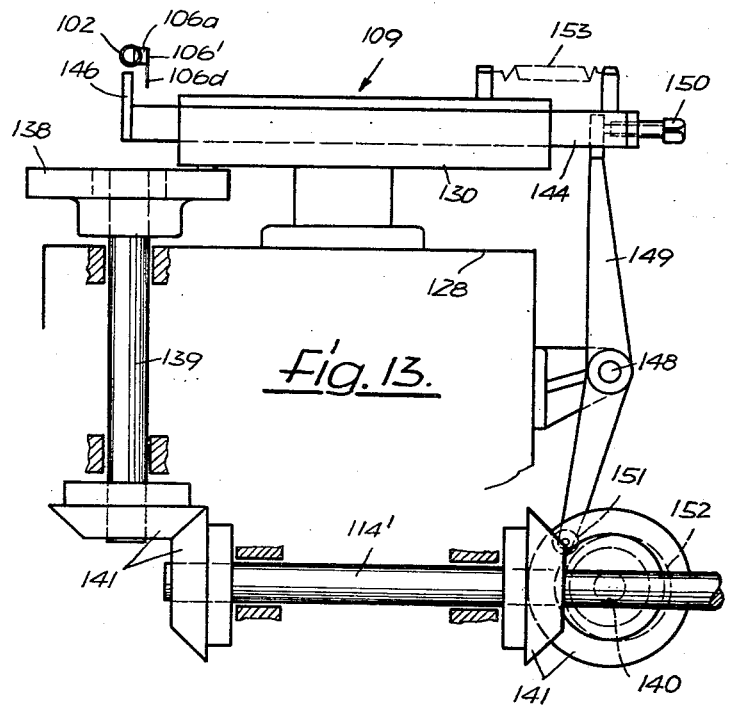
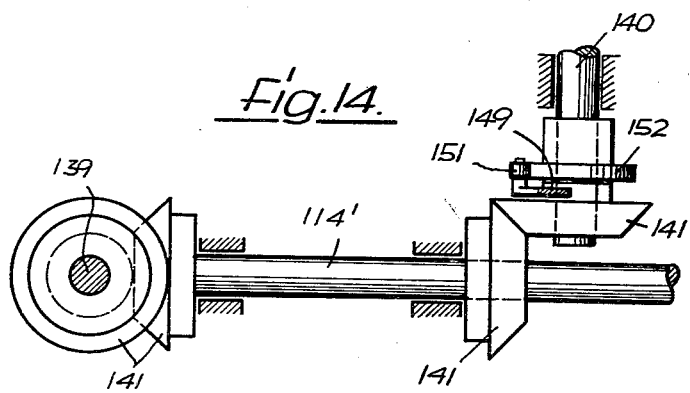

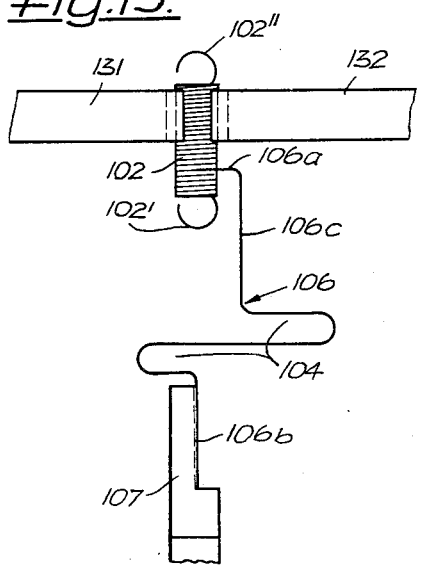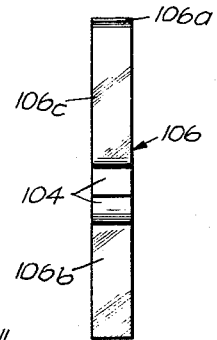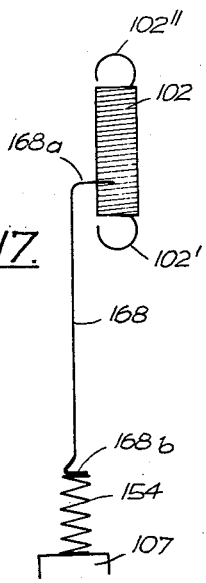

United States Patent Office 3,192,748
Patented July 6, 1965

3,192,748
METHOD AND APPARATUS FOR PRODUCING COIL SPRINGS
Gerhard Lange, Reutlingen, Baden-Wurttemberg, Germany, assignor to Wafios Maschinenfabrik Wagner, Ficker & Schmid, Reutlingen, Baden-Wurttemberg, Germany, a company of Germany
Filed Nov. 7, 1962, Ser. No. 235,968
Claims priority, application Germany, Nov. 9, 1961, W 31,034; Nov. 10, 1961, W 27,153
17 Claims. (Cl. 72—14)

The present invention relates to a method and a machine for producing coil springs of metal wire.

A principal object of the invention is to provide a method and an apparatus for such a machine which permit the start of a coil spring while being made to be accurately fixed in a certain position so that all springs which are produced in this machine will have exactly the same length.

Another object of the invention is to employ the above-mentioned feature as a basis for insuring that the coil springs after being produced are always located in the machine in exactly the same position from which they may then be picked up and removed by special means.

A further object of the invention is to provide these special means and to design them so as to permit the coil springs after being produced to be conveyed successively to other apparatus for being further treated and to present the springs to these apparatus always in precisely the same position. These additional apparatus may, for example, be of a conventional type for bending the ends of each coil spring into an eye, arm, or the like.

The spring winding machine to which the present invention and particularly its object relates, to fix the starting point of the wire of a coil spring in a certain position while the spring is being made, is generally of the conventional type in which the driving means of the feed rollers which effect the feeding of the wire to the spring winding tools consist of a revolving control shaft, a crank which is driven by this shaft and the leverage of which is adjustable, and a freewheel clutch or the like which is mounted on one of the feed roller shafts, and in which the feed rollers are driven by these driving means only during every alternate half revolution of the crank. In such a machine one of the feed roller shafts is usually driven through the freewheel clutch by means of a pinion which, in turn, is driven by a toothed segment which is reciprocated by the crank at a stroke length which is in proportion to the length of the wire which is to be fed for producing a coil spring.

In the process of winding coil springs, the ends of which are thereafter to be worked upon by special apparatus, for example, for bending these ends into the form of eyes or spring arms, to which apparatus the springs are conveyed automatically by special conveying means, it is important that the starting point of the completed coil springs be accurately fixed in a certain position so that the elements of the spring conveying means and the additional apparatus for working on the spring ends will receive all springs at a certain position and these apparatus will thus be able to carry out a uniform and accurate work on the ends of all springs. Since a coil spring after being wound and until it is cut off remains in connection with the wire which is fed to the winding tools by feed rollers, the position of the start of the wound spring is primarily dependent upon the wire feed. It is, however, also dependent upon other factors, for example, the particular material of the wire. Therefore, the object to fix the exact location of the start of a wound spring cannot be attained with sufficient accuracy by means of the conventional wire feeding means. Especially in the production of very small coil springs even a variation of only a fraction of a millimeter must be avoided which cannot be done with the known feeding means.

The present invention permits the starting point of a coil spring and thus the total length thereof to be accurately fixed by employing every alternate half revolution of a shaft to produce a coarse feed of the wire to a length which is less than the total length required for making the desired springs, and by employing the other half revolution of the shaft to carry out a fine feed which is terminated electrically by the engagement of the end surface of the start of the spring which then serves as an electric contact, with an associated contact. The starting end of the spring may serve as an electric contact since through the metal wire of which the coil spring is wound and through the metallic winding tools the spring is conductively connected to the machine itself, the body of which forms a part of an electric low-amperage circuit which is opened and closed by the mentioned contacts. In order to operate with as little inertia as possible, it is advisable to employ an electronic relay, the operation of which is controlled by the closing and opening of these contacts to control the fine feed of the wire.

For carrying out the mentioned steps in the method of producing the coil springs, the spring winding machine is provided with additional driving means which while the drive through the crank is inactive act upon the feed roller shaft by means of the revolving control shaft through a magnetic clutch and the freewheel clutch. The machine is further provided with a limit switch which energizes the magnetic clutch at the end of every alternate half revolution of the crank, and with an electric contact device, the contacts of which are formed by an electrically conductive stop member and by the end surface of the starting end of the spring which is being made and which is under current. When these two contacts engage with each other, a relay is energized whereby the circuit of the magnetic clutch is interrupted and this clutch is disengaged.

More specifically, the invention concerns an apparatus in which a pinion, which drives one of the feed roller shafts in a conventional manner through a freewheel clutch or the like, is driven by a toothed segment which is moved back and forth by the crank, the leverage of which is adjustable. The apparatus is further provided with an auxiliary toothed segment which is moved back and forth by the control shaft and acts upon a pinion which is connected to the driving member of the magnetic clutch.

In order to insure that the stop member, which serves as an electric contact in association with the other contact which is formed by the end surface of the starting end of the spring, will not interfere with the ejection of the completed spring, this stop member is mounted on one end of a lever and is electrically insulated therefrom. The movements of this lever are controlled in such a manner that the stop member will enter into the path of movement of the spring while it is being made and will be retracted when the completed spring is to be ejected.

The method and apparatus as above described are applicable not only to spring winding machines, but also in numerous other cases in which the location of one end of a wire has to be very accurately determined.

The coil springs which are thus produced of an exactly equal length and which, when completed, are located in a certain position are thereafter conveyed from the winding mechanism to at least two additional work stations or apparatus in which the ends of the springs are worked upon. According to the invention, this is done by spring holding means which, apart from picking up and delivering the springs, carry out a movement along a circular track and present the springs successively to the additional work stations where the ends of the springs are bent into the shape of eyes, hooks, or spring arms.

Although there are conveying means known in the form of a turntable on which electromagnets are mounted in a circular arrangement for picking up the coil springs individually from the spring winding machine for presenting them successively to the additional work stations and for then delivering or ejecting them from the machine, such a mechanism has the disadvantage that, because of the necessity of arranging these work stations around the turntable the diameter of the latter must be relatively large. Consequently, its speed of rotation and thus also its conveying output is relatively low. Furthermore, such a turntable with magnets thereon has the disadvantage that it can only be used for coil springs of a magnetizable material and only for holding coil springs of larger sizes since, in order to hold each individual spring securely, each magnet must have a certain minimum size and, when small coil springs are being made will therefore possibly engage with the entire length of the spring so that no space remains on the spring for the engagement of the gripping means or the like with which the additional work stations have to be equipped for carrying out the necessary work on the spring ends.

According to the present invention, however, the coil springs are conveyed to and past the additional work stations by means of spring holding elements which revolve along a circular track and successively pick up the coil springs from the winding machine, present them with one end of a first work station where a certain work is carried out on this end of each spring, thereafter take the springs successively to a transfer station where they are successively transferred to similar spring holding elements revolving along a second circular track which then successively present the springs with their other ends to a second work station where these ends are worked upon, whereupon finally the completed springs are ejected from the machine.

The apparatus for carrying out this method is accordingly provided with two rotary elements, each of which is equipped with mechanically operated spring holding elements and one of which picks up the coil springs successively from the spring winding machine, presents them to a first apparatus where one end of each spring is worked upon, then convey the springs to a transfer mechanism which picks up the spring from the holding elements of the first rotary element and transfers them to similar spring holding elements on a second rotary element which then presents the spring to a second apparatus for working on the other end of each spring and thereafter delivers the finished springs. By dividing the conventional turntable into two rotary elements, the conveying speed of the apparatus is considerably increased. Furthermore, by omitting the electromagnets it is now also possible to convey coil springs which are made of nonmagnetizable metals. Finally, such an apparatus also permits the employment of spring holding elements of a special design which are also capable of holding very short coil springs in a manner so as to permit their ends to be easily worked upon and the springs to be always presented to the machinery at these work stations in exactly the same position.

These rotary elements are preferably provided in the form of rotating turnstiles or turrets which are equipped with spring holding elements in the form of pickup members which extend and are also movable in radial directions of these turrets.

Each of these pickup members is preferably provided with a blade which is capable of entering between two abutting turns of a coil spring which may be located near one end thereof so that the remainder of the spring may be gripped by suitable means of the machinery for working on the other end of the spring. By their continuous use the slide members on the turrets which carry the pickup members may gradually develop a small amount of play so that the pickup members might then no longer hold the coil springs at exactly the same distances from the axis of the turret. This, however, should be avoided because it may prevent the insertion of the blade of the pickup member between two adjacent turns of the coil spring and also the insertion of the spring to the proper length into the gripping means at the additional work stations. For these reasons it is advisable to design the pickup members so as to be resilient in the radial direction of the turret and to abut against a stop which is provided in the radial direction of movement of the slide members so that the coil spring which is held by the respective pickup member will thus be retained in a certain position when being transferred to the second turret and also when being presented to the gripping means at the two work stations. This resilience of the pickup members in their longitudinal direction and their other required features may be attained by making each of them of a substantially rod-shaped part of a flexible material which is adapted to be resiliently shortened in its longitudinal direction, and which is provided on its free end with a bladelike edge so that this end may be pressed between two adjacent turns of a coil spring, while its other end is secured to one of the mentioned slide members on the turret. Such a pickup member may consist, for example, of a leaf spring which is secured at one end to a slide member of the turret and the flat plane of which extends substantially radially to the axis of the turret, while its free end is bent at a right angle to this plane and is sharpened toward its outer edge. The part between the two ends of each leaf spring is bent, for example, into an S-shaped or double crank-shaped curve.

The pickup member may, however, also consist of a straight leaf spring, one end of which is bent at a right angle to the flat plane of the spring, while its other end is secured to a coil compression spring which extends coaxially to the leaf spring and is, in turn, secured to the slide member of the turret.

The resilient contractibility of the pickup member is of considerable advantage because in conveying coil springs it is sometimes of importance that the start of the coil spring emerging from the spring winding machine will be disposed in a very accurate position at the different work stations relative to the tools thereof for working, for example, on the spring ends to bend eyes or spring arms thereon. This position may have to be so accurate, especially with small springs, that a deviation of a fraction of a millimeter may be of importance. The new pickup member permits the provision of stop members against which the start of the coil spring may abut. In the event, however, that the coil spring is not exactly in a position in which, when it is moved toward the stop member, the starting end of the spring would just engage with the stop member, the coil spring is guided by the respective pickup member in such a manner that it will in any event engage with the stop member.

A pickup member of the type as described has the further advantage that it can engage at any place of a coil spring, but always between two adacent turns thereof, and preferably near the end of the spring so that the remainder of it will be available for being gripped by suitable means for working on the other end of the spring. When employing such pickup members, it is also relatively simple to transfer a coil spring from one pickup member to another and to eject the spring from the latter after the work on the spring has been completed.

The transfer mechanism consists of two jaws which are movable relative to each other and grip and subsequently release a coil spring which is presented to them transversely to their axis by an inwardly swiveled pickup member of the first turret and adjacent to the receiving member of the second turret. These jaws also serve as stops for limiting the radial movement of the pickup members. The transfer mechanism further consists of two fingers which are likewise movable transversely to the axis of the coil spring and are adapted to eject the pickup member of the first turret which presents the coil spring to them from the spring and to press the receiving pickup member into the spring during the period in which the spring is gripped and again released by the jaws.

For transferring the coil springs from the spring winding machine to the first turret and for ejecting them from the second turret, a receiving device and a delivery device are provided which are similar to the transfer mechanism insofar as each of them contains elements similar to those of the transfer mechanism which are necessary for its particular purpose.

The apparatus is preferably surrounded by a continuous train of control shafts which extend at right angles to each other and are coupled to each other, for example, by bevel gears. One of these control shafts is connected to and driven by a shaft of the spring winding machine and therefore all of them are driven simultaneously.

The objects, features, and advantages of the present invention will become further apparent from the following detailed description of a preferred embodiment thereof which is illustrated diagrammatically in the accompanying drawings, in which:

FIGURE 2 shows a plan view of a second part of the entire apparatus and also of some of the elements which are shown in FIGURE 1;

FIGURE 3 shows a side view of the apparatus for fixing the position of the end of the wire which forms the start of a coil spring and for determining the length of the wire required for the spring;

FIGURE 4 shows a cross section which is taken along line III—III in FIGURE 2;

FIGURES 5 and 6 show two enlarged detail views seen at right angles to each other of the stop member for a coil spring and of the end of the spring abutting against this stop member;

FIGURE 9 shows a detail view of a slide member of a turret and of the driving means thereof;

FIGURE 10 shows a plan view of the transfer mechanism;

FIGURE 11 shows a plan view of the transfer mechanism in another operating position;

FIGURE 12 shows a longitudinal section of the transfer mechanism;

FIGURE 13 shows a side view of the driving means of the transfer mechanism;

FIGURE 14 shows a plan view of these driving means;

FIGURE 15 shows a detail view of a pickup member inserted into a spring which is held by a pair of gripping jaws;

FIGURE 16 shows a side view of the pickup member; while

FIGURE 17 shows a detail view of a modification of the pickup member.

Figure 1:
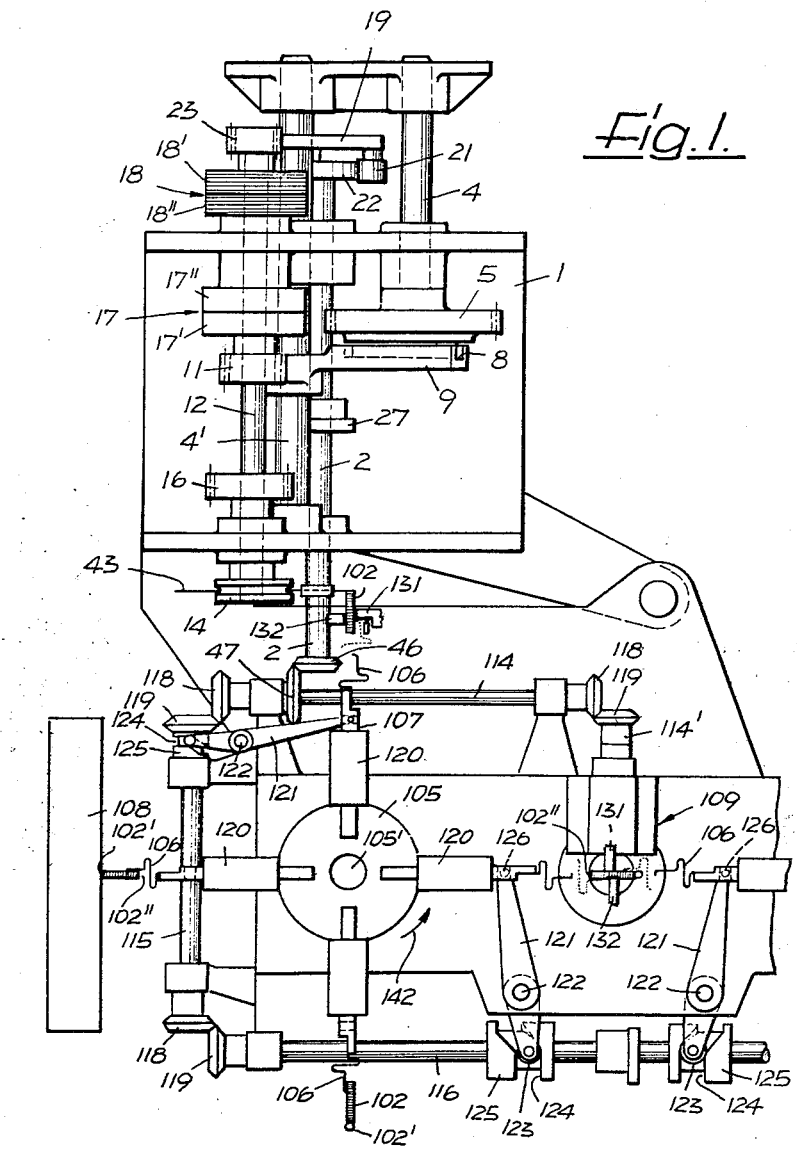
FIGURE 1 shows a plan view of a first part of the entire apparatus.

In the drawings, and as shown particularly in FIGURES 3 and 4, the frame 1 of a spring winding machine carries a control shaft 2 which is rotatably mounted therein and driven at one end in any suitable manner. By means of a gear 3, control shaft 2 drives a gear 5 which is secured to an intermediate shaft 4 which is likewise rotatably mounted on the frame 1. Gear 5 is provided with a radially extending guide member 6 in which the bearing of a roller 7 is mounted so as to be adjustable to different distances from the axis of shaft 4. Roller 7 is movable along a slot 8 in an arm 9 which is integral with a toothed segment 10 and rotatably mounted on a shaft 4' which extends parallel to the intermediate shaft 4 and is likewise mounted on the frame 1. Gear 5 together with roller 7 and arm 9 therefore form a crank with an adjustable stroke length which is adapted to reciprocate the toothed segment 10.

Figure 8:
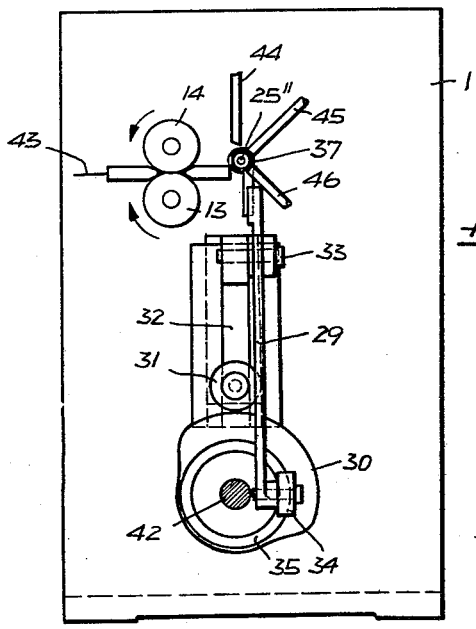
FIGURE 8 shows the parts as illustrated in FIGURE 7, as seen in the axial direction of the control shaft.

The toothed segment 10 is engaged with a pinion 11 which is freely rotatable on a shaft 12 which is likewise mounted on frame 1. This shaft 12 carries a feed roller 13 which cooperates with a second feed roller 14 so as to feed a wire 43. Feed roller 14 which is also rotatably mounted on frame 1 is driven by shaft 12 through a pair of meshing gears 15 and 16 at the same rate of speed as feed roller 13 but in the opposite direction. The two feed rollers 13 and 14 feed the wire 43 for making the springs to the winding tools 44, 45, and 46, as indicated in FIGURE 8, which are operated in a conventional manner. Pinion 11 is rigidly secured to the driving member 17' of a freewheel clutch 17, and both together are freely rotatable on the feed roller shaft 12. The driven member 17" of the freewheel clutch 17 is rigidly secured to the driven member 18" of a magnetic clutch 18 which is preferably a multiple-disk clutch. The clutch members 17" and 18" are rigidly secured to the feed roller shaft 12. Therefore, when the toothed segment 10 is driven in the forward direction, shaft 12 is driven, while during the return movement of segment 10 shaft 12 remains stationary. The mechanism as above described is conventional in the art with the exception of the magnetic clutch 18 and its combination and cooperation with this mechanism.

According to the present invention, this mechanism is, however, improved and further developed by the provision of means whereby at first not the entire length of the wire which is required for producing a coil spring is fed to the winding tools, but only a coarse feed is carried out to a wire length slightly less than the total length, and whereby immediately thereafter a fine feed is carried out to attain the exact length which is required for the production of a coil spring. Thus, each complete feeding movement of the wire for one spring is composed of two separate movements, a course feeding movement and a fine feeding movement for which separate means are required.

This is attained by a suitable adjustment of the radial position of roller 7 on gear 5 and by the provision of auxiliary driving means consisting of the magnetic clutch 18 and the freewheel clutch 17 which exert auxiliary driving impulses upon the feed roller shaft 12 during the periods in which this shaft 12 is not driven by the control shaft 2 through the crank 5, 6, 9. The operation of these auxiliary driving means is controlled electrically by the spring itself while it is being made.

Shaft 4' carries a two-armed lever 19 which is freely rotatable thereon and is provided at one end with an auxiliary toothed segment 20 and at the other end with a roller 21 which runs along a cam 22 on the control shaft 2. The auxiliary toothed segment 20 engages with a pinion 23 which is rigidly secured to the driving element 18' of the magnetic clutch 18. This driving element 18' and the pinion 23 are freely rotatable on the feed roller shaft 12, while the driven element 18" of the magnetic clutch 18 is rigidly secured to the driven element 17' of the freewheel clutch 17 and both together are rigidly secured to the feed roller shaft 12. Cam 22 is designed and mounted in such a manner on control shaft 2 that, when the magnetic clutch 18 is energized, the additional segment 20 will drive the feed roller shaft 12 during the time when the main segment 10 does not act upon this shaft because of the disengagement of the freewheel clutch 17.

Control shaft 2 further carries a cam plate 27 which is adapted to actuate a limit switch 28 which is electrically connected by conductors 38 and 39 to the magnetic clutch 18. Cam plate 27 is designed so that the magnetic clutch 18 will be energized through switch 28 as soon as the toothed segment 10 starts its return stroke. The circuit which is closed by the limit switch 28 will be interrupted so that clutch 18 will be disengaged by the action of the spring itself, as will hereafter be described.

Figure 7:
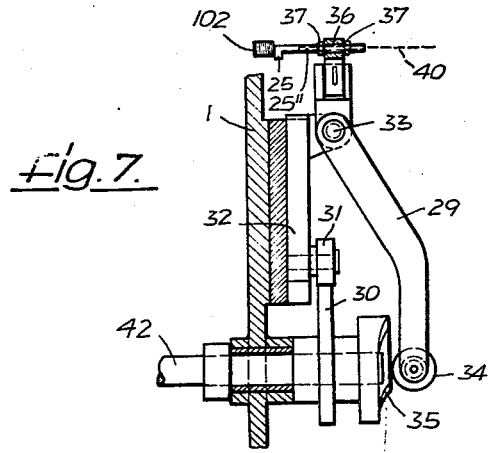
FIGURE 7 shows a detail view of a stop member which may be swiveled out of the path of the spring and of the parts for moving this member.

In the path along which a spring 102 moves while being made by an otherwise conventional spring winding machine, an adjustable stop member 25 is mounted, as shown particularly in FIGURES 5 to 7. This stop member 25 has a stop surface 25' which extends parallel to the axis of spring 102 and against which the end surface 26' of the starting end 26 of the spring engages as soon as the spring has been wound completely and reaches its exact desired length. The end surface 26' of spring 102 and the stop surface 25' of stop member 25 form the contacts of an electric contact device. Stop member 25 is electrically insulated and connected by a conductor 40 to one contact of the switch 28 (FIGURE 3). Another contact 41 of this switch is connected either to frame 1 of the machine, to the wire feeding device 13, 14, or directly to the spring winding mechanism. Spring 102 itself will then form an electric contact since, through the wire of which it is made, it is conductively connected to the spring winding mechanism or at least to the wire feeding device.

After spring 102 has been completed, it is advisable to remove the stop member 25 from the path of movement of the spring so as not to interfere with the ejection of the spring and to prevent that during the ejection the spring has to slide along the stop member 25. For this purpose, stop member 25 is mounted on, but electrically insulated from one end of a two-armed lever 29, as shown in FIGURES 7 and 8, which is pivotably mounted at one end at 33 on a slide member 32 which is movable along frame 1. This slide member 32 is driven by a cam plate 30 on a shaft 42 through a roller 31 on the slide member, and shaft 42 is, in turn, driven by the control shaft 2. Lever 29 carries on its other end a roller 34 which runs along a cam plate 35 which is likewise secured to shaft 42. By the operation of these cams, stop member 25 is moved into the path of spring 102 while it is being made, but it is retracted when the finished spring is to be ejected. Stop member 25 is adjustable in the axial direction of its shaft 25" within an electrically insulating bushing 36 which is mounted on lever 29, and it may be secured in the adjusted position by nuts 37. Stop member 25 is therefore also rotatable about its axis so that its stop surface 25' may also be adjusted.

The operation of the apparatus for accurately determining the length of the wire for one coil spring and for adjusting the spring to an accurate position in the machine is as follows:

The coarse feed of the wire 43 to a length which is less than the total length required for producing a spring 102, and which is adjustable by a radial adjustment of roller 7 on gear 5, is produced by the rotation of control shaft 2 which through gear 3 drives the gear 5 so that the roller 7 which is adjusted to a suitable radial distance from the axis of the intermediate shaft 4 will be moved along a circular path. During each half revolution of gear 5 and the corresponding movement of roller 7 along its circular path about an angle of 180°, this movement of roller 7 is transmitted by arm 9 to the toothed segment 10 which is thus pivoted about shaft 4' in the direction of the arrow 10', whereby pinion 11 is moved in the direction of the arrow 11' and by means of the freewheel clutch 17 then transmits this rotation to the feed roller shaft 12. During the other half of the revolution of gear 5 the toothed segment 10 is moved in the direction opposite to that of arrow 10' and pinion 11 therefore also in the direction opposite to that of arrow 11'. Since the freewheel clutch 17 is disengaged during this reverse movement of pinion 11, no movement is transmitted to the feed roller shaft 12.

As soon as gear 5 completes its half revolution during which the feed roller shaft 12 is driven, that is, as soon as the freewheel clutch 17 is disengaged, the magnetic clutch 18 is energized through the limit switch 28, and cam 22 then also begins to move the auxiliary toothed segment 20 so that, as the result of the engagement of clutch 18, the feed roller shaft 12 will be further rotated.

While being wound, spring 102 is shifted at each revolution in its axial direction at least for a distance equal to one diameter of its wire. As soon as during this movement the end surface 26' of the starting end 26 of the spring engages upon the top surface 25', a circuit is closed since these surfaces then act as electric contacts whereby preferably an electronic relay which is combined with switch 28 is energized so as to interrupt the circuit of the magnetic clutch 18. The feed roller shaft 12 will then stop, while the toothed segment 20 will continue to run idly as long as it is actuated by cam 22.

After being produced by the spring winding machine according to FIGURES 3 to 8 by means of the winding tools 44, 45, and 46, the coil springs 102 are removed one after the other from this machine by a turret 105 in cooperation with a receiving mechanism 112. This turret 105 is provided, for example, with four spring holding or pickup members 106 which are secured to slide members 107 which are slidable in radial directions in guides 120 on the turret 105. By the rotation of turret 105, coil springs 102 are passed successively by the pickup members 106 to a first work station 108 which is only indicated diagrammatically in the drawings and in which the springs may, for example, be provided at one end with eyes 102'. By a further rotation of turret 105, springs 102 are passed successively to a transfer mechanism 109 where they are taken over by the pickup members 106 of a second turret 110. After this second turret 110 has been rotated, springs 102 are presented with their other end 102" to a second work station 111 which is likewise indicated only diagrammatically. After being worked on at this station, the springs may then be passed consecutively to a delivery station 113.

The apparatus as above described is preferably surrounded by a series of control shafts 114, 114', 115, 116, and 117, as shown in FIGURES 1 and 2, which extend at right angles to each other and are connected, for example, by means of pairs of bevel gears 118 and 119. Control shaft 114 driving all of the other shafts may be driven by the control shaft 2 of the spring winding machine through bevel gears 46 and 47. Control shaft 114' drives the transfer mechanism 109 and also rotates the two turrets 105.

As shown in FIGURES 1 and 2, the slide members 107 of turrets 105 and 110 which carry the pickup members 106 are mounted in the guides 120 on the turrets 105 and 110 so as to be slidable in radial directions and they are moved back and forth by two-armed levers 121, two of which are provided for each turret 105 and 110. One end of each two-armed lever 121 which is pivotably mounted at 122 is provided with a roller 123 which engages into a cam groove 124 of a cam member 125, while the other end of each lever 121 is provided with a pin 126, as shown particularly in FIGURE 9, which engages into a groove 127 when a slide member 107 is pivoted to a position opposite to the transfer mechanism 109.

The pickup members 106, as shown particularly in FIGURES 15 and 16, consist of leaf springs, each of which is secured at one end to the associated slide member 107. The plane of each leaf spring 106 extends substantially radially to the axis of rotation 105' or 110' of turret 105 or 110, respectively, the free end portion 106a of each leaf spring is bent over at a right angle from the plane of the spring and is sharpened toward its end. This blade-like part 106a is adapted to enter from one side between two adjacent turns of a coil spring 102 in a manner so as not to interfere with any tools in the work stations 108 and 111 which act upon the respective end of the spring. Between the two ends 106a and 106b the leaf spring is bent twice back and forth similar to a double crank 104 which permits the pickup member to yield and be shortened elastically in its longitudinal direction. The two arms 106b and 106c of the spring may extend either coaxially or parallel to each other.

As illustrated in FIGURE 17, one or more of the pickup members may also be designed so that one end 168a of a straight leaf spring 168 is bent over at a right angle and sharpened like a blade toward its outer edge, while its other end 168b is secured to a coil spring 154 which extends coaxially to leaf spring 108 and is compressible in the axial direction thereof and is, in turn, secured to a slide member 107.

The transfer mechanism 109, as shown in FIGURES 10 to 17, consists of a plate 128 on which a pair of guide rails 129 and 130 are mounted for guiding two jaws 131 and 132 which as seen in a plan view are slidable in a direction at right angles to the radially extending axis of the slide members 107 which are facing the transfer mechanism when the turrets 105 and 110 are turned accordingly. During the operation, jaw 131 remains stationary as it is only adjustable in its longitudinal direction, for example, by a setscrew 133 for setting it up to the diameter of the coil springs. Jaw 132, however, which is adjustable in the same manner by a setscrew 134 is movable on a slide 135 in the longitudinal direction of the jaw by means of a roller 136, as shown particularly in FIGURE 12, which is mounted on the jaw and runs in a cam groove 137 in a cam plate 138. This cam plate 138 is secured to a vertical shaft 139 which is driven by shaft 114′ through bevel gears 141.

While jaws 131 and 132 are in the retracted position, a coil spring 102 which is held by a pickup member 106′ and one end 102′ of which is provided, for example, with an eye at the work station 108 is presented to the transfer mechanism 109 in the position as shown in FIGURE 10 by turning the turret 105 in the direction of the arrow 142 in FIGURE 2, and it is thereafter shifted by the associated slide member 107 to the transfer position, as shown in FIGURE 11, in which the coil spring 102 is gripped by the jaws 131 and 132 which are provided with gripping recesses 143, as shown in FIGURE 12. Jaws 131 and 132 are further provided with stop surfaces 131′ and 132′. The bent ends 106a of the respective pickup members 106′ and 106″ on turrets 105 and 110 which are then located in the transfer mechanism 109 abut against these stop surfaces 131′ and 132′ before jaws 131 and 132 have fully gripped the coil spring 102. Thus, all coil springs 102 of the same kind will be gripped by jaws 132 and 131 in exactly the same position and they are always also in equal positions relative to the pickup members 106″ to which they are transferred.

The transfer of a coil spring 102 by the pickup member 106′ on the turret 105 to a pickup member 106″ on turret 110 is effected by slide members 144 and 145 which are slidable in the guide rail 130 of the transfer mechanism 109 in a direction parallel to the direction of movement of jaws 131 and 132. For separating the pickup member 106′ from the coil spring 102, slide member 144 which during the separation moves downwardly as viewed in FIGURES 10 and 11 is provided with an upstanding projection 146, as shown particularly in FIGURE 13, which in the inactive position is located underneath coil spring 102. Each pickup member 106′ of turret 105, as shown specifically in FIGURE 10a, is provided with a downwardly projecting tab 106d on which the projection 146 of slide member 144 engages when the latter is moved, so that the bent end 106a of pickup member 106′ will then be drawn out of the coil spring 102. Simultaneously with this movement of slide member 144, slide member 145 carries out a corresponding movement in the same direction. Its vertical projection 147 then presses against a tab similar to tab 106d on the pickup member 106″ so that the bent end 106a of this pickup member is pressed between two adjacent turns of coil spring 102. Thereafter, jaws 131 and 132 release the coil spring 102 to permit it to be withdrawn by the pickup member 106 from the transfer mechanism 109.

Slide members 144 and 145 are operated simultaneously by a two-armed lever 149 which is pivotably mounted by a pivot pin 148 on the base plate 128 of the transfer mechanism 109. One end of lever 149 engages with the slide members 144 and 145 by means of setscrews 150, as shown in FIGURE 11, while its other end carries a roller 151 which runs along a cam plate 152 which is secured to a shaft 140 which is driven by shaft 114′ through bevel gears 141′. The movement of slide members 144 and 145 by the two-armed lever 149 occurs against the action of tension springs 153 which tend to draw the slide members toward their inactive position.

The receiving mechanism 112, as shown in FIGURE 2, which transfers the coil springs 102 from the spring winding machine 1 to the pickup members 106 on the turret 105 is of a construction similar to the transfer mechanism 109, but it does not have to be provided with the slide member 144 since its sole purpose is to press the pickup members 106 (which in the mechanism 112 correspond to the position of the pickup members 106″ as shown in FIGURES 10 and 11) into the coil springs 102 which are ready to be picked up.

The delivery mechanism 113, as shown in FIGURE 2, which is intended for the purpose of ejecting the coil springs 102 from the apparatus after both of their ends 102′ and 102″ have been worked upon may also be of a construction similar to that of the transfer mechanism 109, but it does not have to be provided with the slide member 145 since it is merely intended for pushing the pickup members 106 (which in the delivery mechanism 113 correspond to the position of the pickup members 106′ in FIGURES 10 and 11) out of the coil springs 102.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a machine for producing coil springs of metal wire, a control shaft, means for rotating said control shaft, the adjustable wire feed of the wire being carried out during each alternate half revolution of said control shaft, means for accurately determining the length of feed of the wire and for fixing the particular location of the end of the wire forming the start of a coil spring, means for carrying out during each alternate half revolution of the control shaft a coarse feed of the wire for a distance less than the total length required for producing a spring, and additional means for carrying out during each other half revolution of said control shaft a fine feed of the wire, an electric circuit, means for terminating said fine feed by closing said electric circuit by the engagement of the starting end of the coil just completed forming an electric contact with an associated contact.

2. In a machine for producing coil springs of metal wire, means for accurately feeding said wire comprising a mechanism for winding coil springs, a pair of feed rollers adapted to grip a continuous wire between them and to feed the same to said mechanism to be wound into coil springs, a feed roller shaft for driving said feed rollers, a driven control shaft, first means for driving said feed roller shaft by said control shaft during each alternate half revolution of said control shaft, and second means for driving said feed roller shaft by said control shaft during a part of each other alternate half revolution of said control shaft.

3. In a machine for producing coil springs of metal wire, means for accurately feeding said wire comprising a mechanism for winding coil springs, a pair of feed rollers adapted to grip a continuous wire between them and to feed the same to said mechanism to be wound into coil springs, a feed roller shaft for driving said feed rollers, a driven control shaft, first means for driving said feed roller shaft by said control shaft during each alternate half revolution of said control shaft, said first means including a pinion mounted on and freely rotatable relative to said feed roller shaft and a free wheel clutch having a driving member and a driven member, said driving member being mounted on and freely rotatable relative to said feed roller shaft and rigidly secured to said pinion, said driven member being mounted on and rigidly secured to said feed roller shaft, second means for driving said feed roller shaft by said control shaft during a part of each other alternate half revolution of said control shaft, said second means including a magnetic clutch having a driving member and a driven member, said last driven member being mounted on and rigidly secured to said feed roller shaft, and said last driving member being mounted on and freely rotatable relative to said feed roller shaft, a pinion driven by said control shaft and mounted on and freely rotatable relative to said feed roller shaft and rigidly secured to said driving member of said magnetic clutch, and means for controlling said magnetic clutch.

4. In a machine for producing coil springs of metal wire as defined in claim 3, said means for controlling said magnetic clutch comprising a switch including a preferably electronic relay for disconnecting said switch, a cam plate mounted on said control shaft for controlling said switch so as to energize said magnetic clutch, an electric conductor connecting the just completed coil spring acting as an electric contact with said relay, a stop member adapted to be engaged by the just completed spring and acting as an associated electric contact to said first contact and mounted on but electrically insulated from said machine at a distance from the mechanism for winding the coil springs in accordance with the exact length of each spring, said contact and associated contact when engaging with each other adapted to disengage said magnetic clutch.

5. In a machine for producing coil springs of metal wire as defined in claim 4, in which said associated contact comprises a shaft extending coaxially to the axis of a spring just completed and adapted to be rotatably adjusted about said axis and to be locked in the adjusted position, said shaft having a surface extending radially to said spring axis and adapted to be engaged by the end surface of the wire forming the start of the just completed spring as soon as the latter reaches its accurate prescribed length.

6. In a machine for producing coil springs of metal wire as defined in claim 5, in which said associated contact is mounted on and electrically insulated from a lever pivotably mounted on a slide member movable on the machine in a vertical direction thereto and adapted to swivel said associated contact into and out of the axis of the spring and within a plane extending through said axis.

7. In a machine for producing coil springs of metal wire, means for conveying coil springs successively by means of pickup members from their point of production, where after being wound they are adapted to be located in an accurately fixed position toward and past additional work stations to which said springs are successively presented in an accurately fixed position, and then to a point of ejection of the springs, first pickup members for removing said springs successively from said point of production means for revolving said first pickup members along a circular path, so that said first pickup members move successively toward and past a first work station where they are stopped and successively present said coil springs to said first work station for working upon one end of each of said springs, second pickup members for receiving said springs successively from said first pickup members, means for transferring said springs successively from said first pickup members to said second pickup members, means for revolving said second pickup members along a circular path, so that said second pickup members move successively toward and past a second work station where they are stopped and successively present the coil springs to said second work station for working upon the other end of each of said springs, and means for ejecting the springs successively from said second pickup members.

8. In a machine for producing coil springs of metal wire, means for conveying coil springs successively from their point of production, where after being wound they are located in an accurately fixed position, toward and past additional work stations to which the springs are successively presented, and then to a point of ejection of said springs, a driven mechanism for winding said coil springs, a first rotary element, first pickup members mounted on and each movable in a radial direction of said first rotary element for successively picking up said coil springs, for successively moving said springs toward and past a first work station, and for successively delivering said springs, receiving mechanism for successively receiving the completed coil springs from the winding mechanism and for transferring said springs successively to said first pickup members of said first rotary element, a second rotary element, second pickup members mounted on and each movable in a radial direction of said second rotary element for successively picking up the coil springs, for successively moving said springs toward and past a second work station, and for successively delivering said springs, a transfer mechanism for successively transferring said springs from said first pickup members of said first rotary element to said second pickup members of said second rotary element, a delivery mechanism for successively receiving said coil springs from said second pickup members of said second rotary element and for ejecting said springs, and common driving means driven by said spring winding machine for driving said rotary elements and said transfer mechanism and for controlling said first and second pickup members, said receiving mechanism, said transfer mechanism and said delivery mechanism.

9. In a machine for producing coil springs of metal wire as defined in claim 8, in which said common driving means include a system of second control shafts extending angularly to and in series with each other, each adjacent pair of said second control shafts being connected to each other by a pair of bevel gears, and one of said second control shafts being driven by the control shaft of the spring winding machine.

10. In a machine for producing coil springs of metal wire as defined in claim 9 and having a first and a second rotary element, each comprising a driven disk rotatably mounted, guide members mounted on and extending radially of said disk, a plurality of slide members, each of said slide members being guided in one of said guide members and movable in the radial direction of said disk and having a groove extending tangentially to the circular path along which said groove moves during the rotation of said disk, each of said slide members carrying one of said pickup members, two two-armed levers pivotably mounted on said machine, one arm of each of said levers having at one end a pin adapted to engage into one of the associated slide members when said last slide member is in a rotary position in which a coil spring is received or delivered by a pickup member on one of said rotary elements, the other arm of each two-armed lever having at one end a roller, and a cam plate for each of said levers having a groove for guiding said roller and rigidly secured on one of said second control shafts.

11. In a machine for producing coil springs of metal wire as defined in claim 10, in which each of said pickup members consists of a leaf spring having a flat plane extending substantially radially to the associated disk of the associated rotary element and having a free end bent at a right angle to said radial plane and sharpened toward its edge to permit said bent end to be inserted between two adjacent turns of a coil spring, said leaf spring being secured at its other end to the associated slide member and having means thereon to permit said pickup member to be resiliently shortened in the longitudinal direction thereof.

12. In a machine for producing coil springs of metal wire as defined in claim 11, in which said means for resiliently shortening each of said pickup members consists of a substantially S-shaped bent part of said leaf spring.

13. In a machine for producing coil springs of metal wire as defined in claim 11, in which said means for resiliently shortening each of said pickup members comprise a coil spring secured at one end to the other end of said leaf spring and at its other end to said slide member.

14. In a machine for producing coil springs of metal wire having means for conveying the coil springs successively from their point of production, where after being wound they are located in an accurately fixed position, toward and past additional work stations to which the coil springs are successively presented, and then to a point of ejection of the springs, a transfer mechanism as defined in claim 8 comprising a pair of jaws movable coaxially relatively to each other and adapted to grip a coil spring transversely to the axis thereof, after said spring has been moved by one of said pickup members to a transfer position and to release said spring, said jaws being designed and arranged so that a part of the surface of each jaw for gripping said spring is adapted to grip a specific central cylindrical part of said spring, and a lateral surface of each jaw being adapted to serve as a stop for the end surface of one of said pickup members, a pair of fingers movable in the same direction as said jaws, one of said fingers being adapted to eject from said coil spring a pickup member, one bent-over and sharpened end of which has been inserted between two adjacent turns of said spring, the other finger being adapted to push the corresponding bent-over and sharpened end of another pickup member between two adjacent turns of said spring, and means for controlling the movements of at least one of said jaws and of said fingers.

15. In a machine for producing coil springs of metal wire having means for conveying the coil springs successively from their point of production, where after being wound they are located in an accurately fixed position, toward and past additional work stations to which the coil springs are successively presented, and then to a point of ejection of the springs, a transfer mechanism as defined in claim 14, in which said means for controlling the movements of at least one of said jaws and of said fingers comprise a first guide mounted on the machine for the first jaw, a second guide mounted on the machine for the second jaw, a sliding carriage carrying the second jaw and movable in the associated guide for said second jaw, a crank for reciprocating said carriage, a pair of slide members movable in the guide for said carriage and each of them carrying a finger, a two-armed lever pivotably mounted on the machine and having one end adapted to move the slide members carrying said fingers against spring action, a cam plate for controlling the other end of said two-armed lever, means for driving said crank and said cam plate by said common driving means.

16. In a machine for producing coil springs of metal wire having means for conveying the coil springs successively from their point of production, where after being wound they are located in an accurately fixed position, toward and past additional work stations to which the coil springs are successively presented, and then to a point of ejection of the springs, a transfer mechanism as defined in claim 15, in which the first jaw is adjustable relative to the first guide and the second jaw relative to said sliding carriage in the direction of the movement of said jaws relative to each other, and means for adjusting the points of engagement of said two-armed lever on said slide members carrying said fingers in the direction of movement of said slide members.

17. In a machine for producing coil springs of metal wire having means for conveying coil springs successively from their point of production, where after being wound they are located in an accurately fixed position, toward and past additional work stations to which the coil springs are successively presented, and then to a point of ejection of said springs, a receiving and delivery mechanism comprising a pair of coaxial jaws movable relative to each other and adapted to grip a coil spring transversely to the axis thereof after said spring has been located in an accurately fixed position and to release said spring, a pickup member having an end surface, said jaws being arranged such that one surface of each jaw is adapted to serve as a stop for the end surface of said pickup member, a finger movable in the same direction as said jaws and adapted to push a bent over and sharpened end of said pickup member between and out of two adjacent turns of said coil spring, respectively, a first guide mounted on the machine for the first jaw, a second guide mounted on the machine for the second of said jaws, a sliding carriage carrying said second jaw and movable in the associated guide for said second jaw, a crank for producing a reciprocating movement of the sliding carriage, a slide member carrying said finger slidably mounted in the guide for said carriage, a two-armed lever pivotably mounted on the machine and having one end adapted to move said slide member carrying said finger against spring action, a cam plate for controlling the other end of said two-armed lever, and means for driving said crank and said cam plate by said common driving means.

References Cited by the Examiner

UNITED STATES PATENTS 2,517,436  8/50  Jones _____ 140—102

CHARLES W. LANHAM, *Primary Examiner.*